(12) United States Patent
Ikemizo

(10) Patent No.: US 9,720,303 B2
(45) Date of Patent: Aug. 1, 2017

(54) STROBE MECHANISM

(71) Applicant: Panasonic Corporation, Osaka (JP)

(72) Inventor: Takahiro Ikemizo, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/499,803

(22) Filed: Sep. 29, 2014

(65) Prior Publication Data

US 2015/0104163 A1    Apr. 16, 2015

(30) Foreign Application Priority Data

Oct. 15, 2013   (JP) .................................. 2013-214499
Sep. 12, 2014   (JP) .................................. 2014-185899

(51) Int. Cl.
*G03B 15/03*   (2006.01)
*G03B 15/05*   (2006.01)

(52) U.S. Cl.
CPC ...... *G03B 15/05* (2013.01); *G03B 2215/0507* (2013.01)

(58) Field of Classification Search
CPC ........ G03B 15/00; G03B 15/02; G03B 15/03; G03B 15/05
USPC .......................................... 396/177; 348/371
See application file for complete search history.

(56) References Cited

U.S. PATENT DOCUMENTS

| | | | | |
|---|---|---|---|---|
| 4,945,368 A | * | 7/1990 | Ishino et al. .................. | 396/177 |
| 5,752,084 A | * | 5/1998 | Motomura et al. ............... | 396/6 |
| 2005/0007030 A1 | * | 1/2005 | Ina ......................... | G03B 15/05 |
| | | | | 315/241 P |
| 2008/0310832 A1 | * | 12/2008 | Deng ............................ | 396/177 |
| 2010/0060775 A1 | * | 3/2010 | Shintani ............... | H04N 5/2252 |
| | | | | 348/335 |
| 2011/0044681 A1 | * | 2/2011 | Yasuda ......................... | 396/177 |
| 2011/0052171 A1 | * | 3/2011 | Yasuda et al. ................ | 396/176 |
| 2012/0148226 A1 | * | 6/2012 | Nishiwaki .............. | G03B 15/05 |
| | | | | 396/177 |
| 2012/0294601 A1 | * | 11/2012 | Akiyama ............... | G03B 15/05 |
| | | | | 396/177 |
| 2013/0182404 A1 | * | 7/2013 | Mitani .............................. | 362/3 |
| 2013/0259461 A1 | * | 10/2013 | Yoon ............................. | 396/165 |
| 2014/0022757 A1 | * | 1/2014 | Furuta .............................. | 362/4 |

FOREIGN PATENT DOCUMENTS

| | | |
|---|---|---|
| JP | 10-062847 A | 3/1998 |
| JP | 10-104696 A | 4/1998 |
| JP | 2012-242498 A | 12/2012 |

* cited by examiner

*Primary Examiner* — Clayton E LaBalle
*Assistant Examiner* — Fang-Chi Chang
(74) *Attorney, Agent, or Firm* — Renner, Otto, Boisselle & Sklar, LLP

(57) ABSTRACT

The present disclosure provides a strobe mechanism which has a compact constitution thus avoiding vignetting of strobe light rays by a lens barrel. According to one aspect of the present disclosure, there is provided a strobe mechanism which brings a strobe into a use state by making the strobe pop up from a stored state. The strobe mechanism includes: a base member; a slide member held in a movable manner in one direction with respect to the base member; a strobe part which is mounted on the slide member; and a capacitor which supplies electricity to the strobe part; and the capacitor is arranged in a region defined by walls of the slide member.

7 Claims, 10 Drawing Sheets

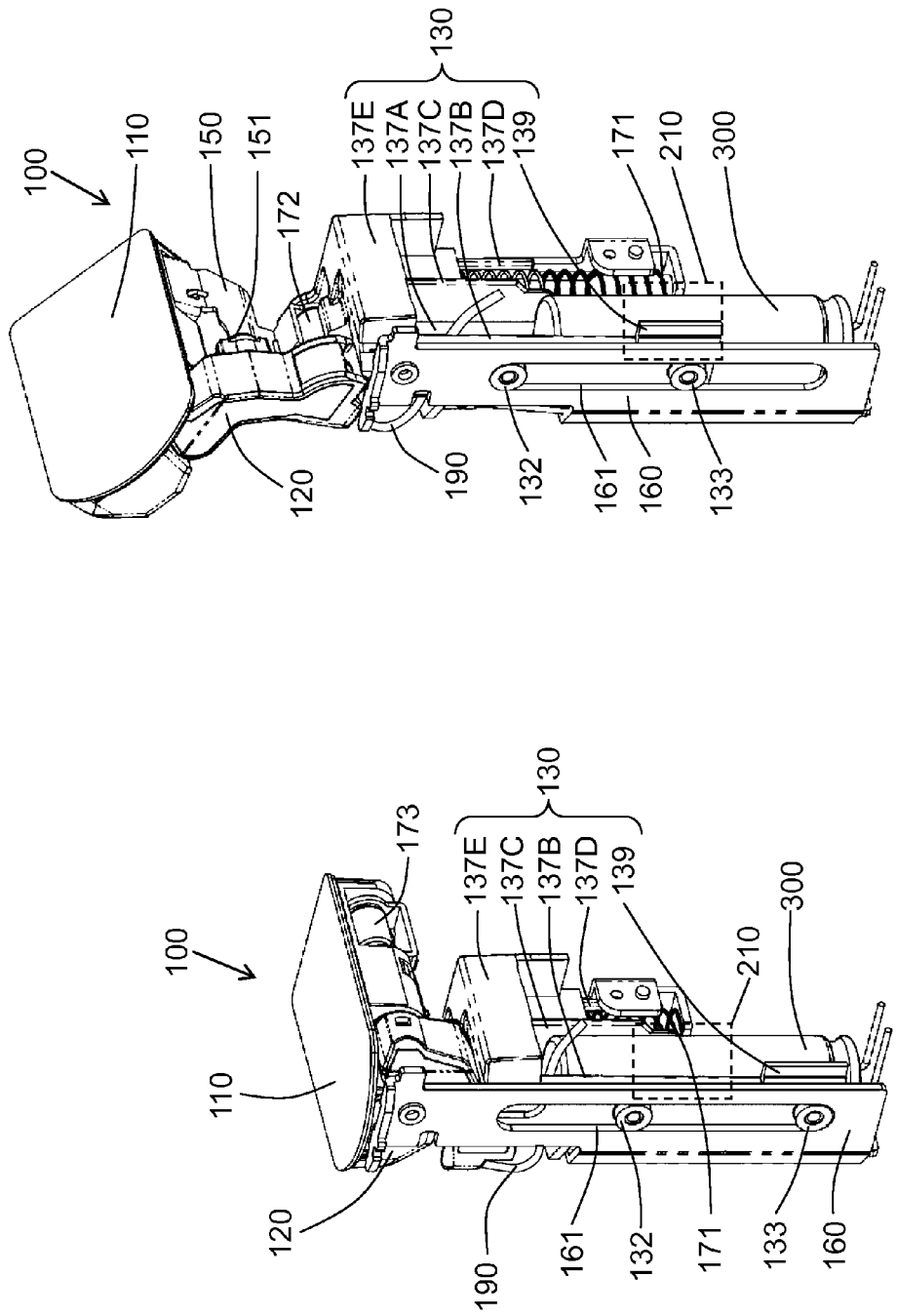

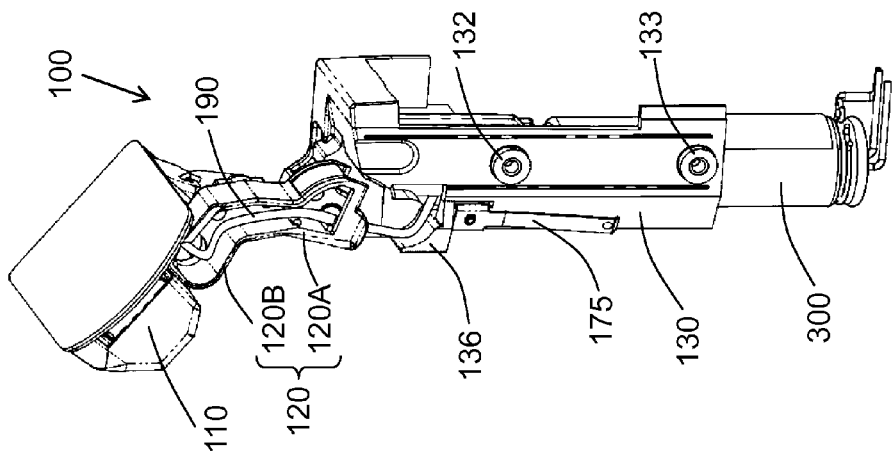
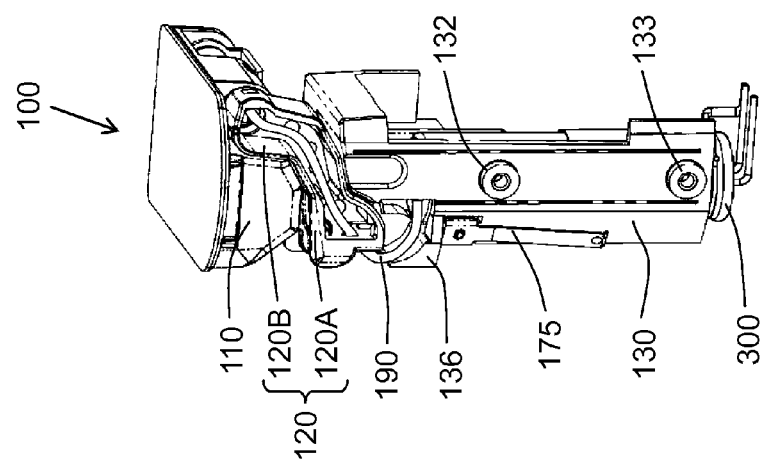

STROBE MECHANISM

BACKGROUND

1. Technical Field

The present disclosure relates to a strobe mechanism used for an imaging device or the like.

2. Description of the Related Art

PTL 1 discloses an imaging device provided with a built-in strobe. PTL 1 also discloses the constitution in which the strobe upwardly slides and is rotated toward a front surface side using an arm.

CITATION LIST

Patent Literature

PTL 1: Unexamined Japanese Patent Publication No. 2012-242498

SUMMARY

The present disclosure provides a strobe mechanism which has a compact constitution thus avoiding vignetting of strobe light rays by a lens barrel.

According to one aspect of the present disclosure, there is provided a strobe mechanism which brings a strobe into a use state by making the strobe pop up from a stored state. The strobe mechanism includes: a base member; a slide member held in a movable manner in one direction with respect to the base member; a strobe part which is mounted on the slide member; and a capacitor which supplies electricity to the strobe part; and the capacitor is arranged in a region defined by walls of the slide member.

The strobe mechanism according to the present disclosure is effective for avoiding the vignetting of light rays by a lens barrel.

BRIEF DESCRIPTION OF DRAWINGS

FIG. 9A is a perspective view as viewed from a right rear side of the strobe mechanism (closed state) according to the first exemplary embodiment;

FIG. 9B is a perspective view as viewed from a right rear side of the strobe mechanism (opened state) according to the first exemplary embodiment;

FIG. 10A is an explanatory view of an arm and electric wiring of the strobe mechanism (closed state) according to the first exemplary embodiment; and FIG. 10B is an explanatory view of the arm and the electric wiring of the strobe mechanism (opened state) according to the first exemplary embodiment;

DETAILED DESCRIPTION OF THE PREFERRED EMBODIMENT

Hereinafter, an embodiment will be described in detail with reference to the drawings appropriately. However, there may be cases where descriptions in detail more than necessary are not given. For example, there may be cases where the detailed explanation of well-known matters and the repeated explanation of the substantially same structure are not given. This avoids the description made hereinafter from being unnecessarily redundant thus facilitating the understanding of the present disclosure by those who are skilled in the art.

Further, the inventor of the present disclosure provides the accompanying drawings and the following descriptions for allowing those skilled in the art to sufficiently understand the present disclosure, and the subject defined in the claims is not intended to be restricted thereby.

(First Exemplary Embodiment)

[1-1. Constitution of Camera]

Figure 1:
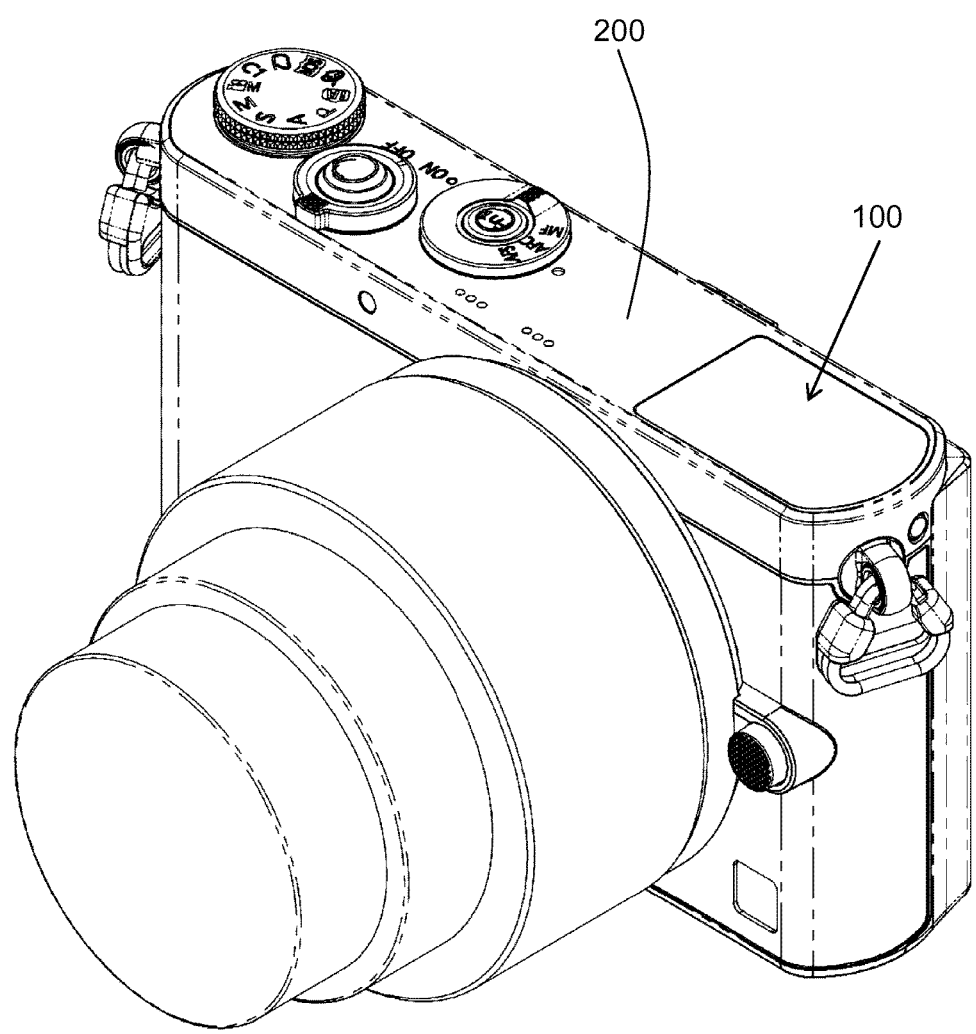
FIG. 1 is a perspective view of a camera according to a first exemplary embodiment.

FIG. 1 is a perspective view of a camera. FIG. 1 shows a state where strobe mechanism 100 is stored in camera housing 200 (closed state). The camera can store strobe mechanism 100 in camera housing 200.

Figure 2:
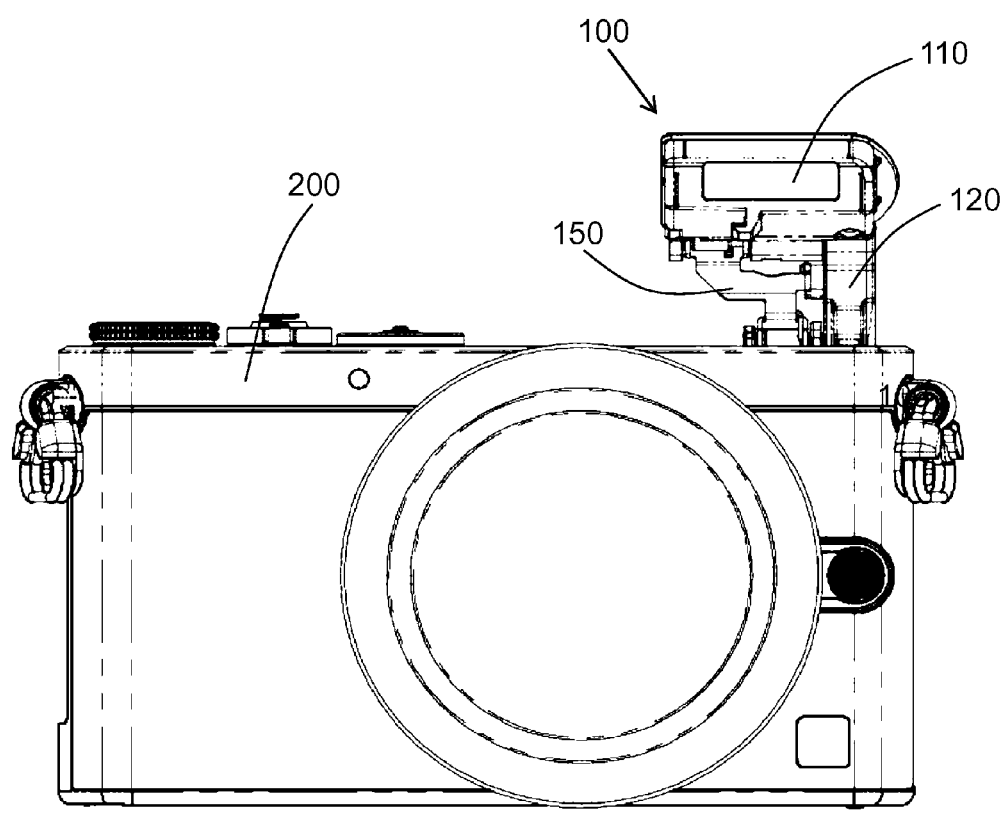
FIG. 2 is a front view of the camera according to the first exemplary embodiment.
Figure 3:
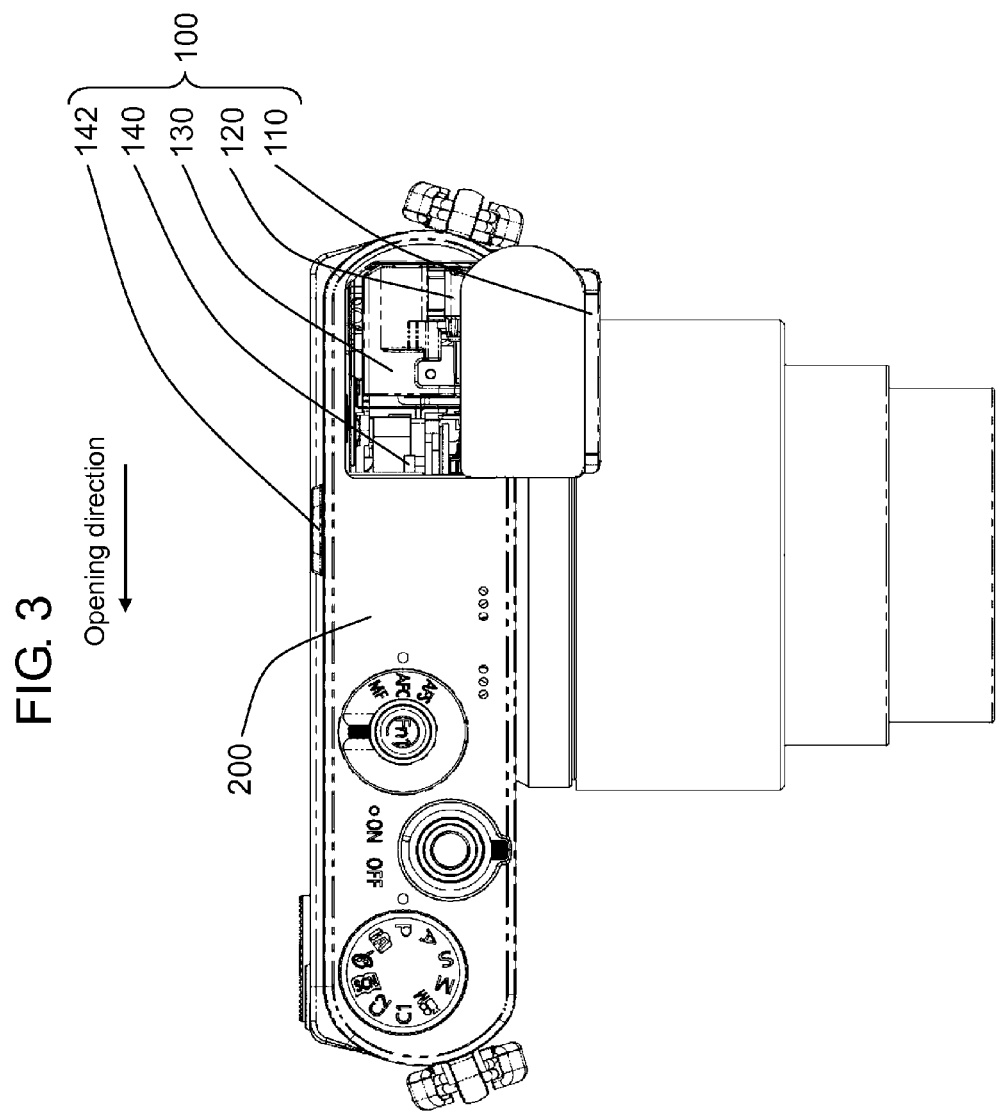
FIG. 3 is a top plan view of the camera according to the first exemplary embodiment.
Figure 4:
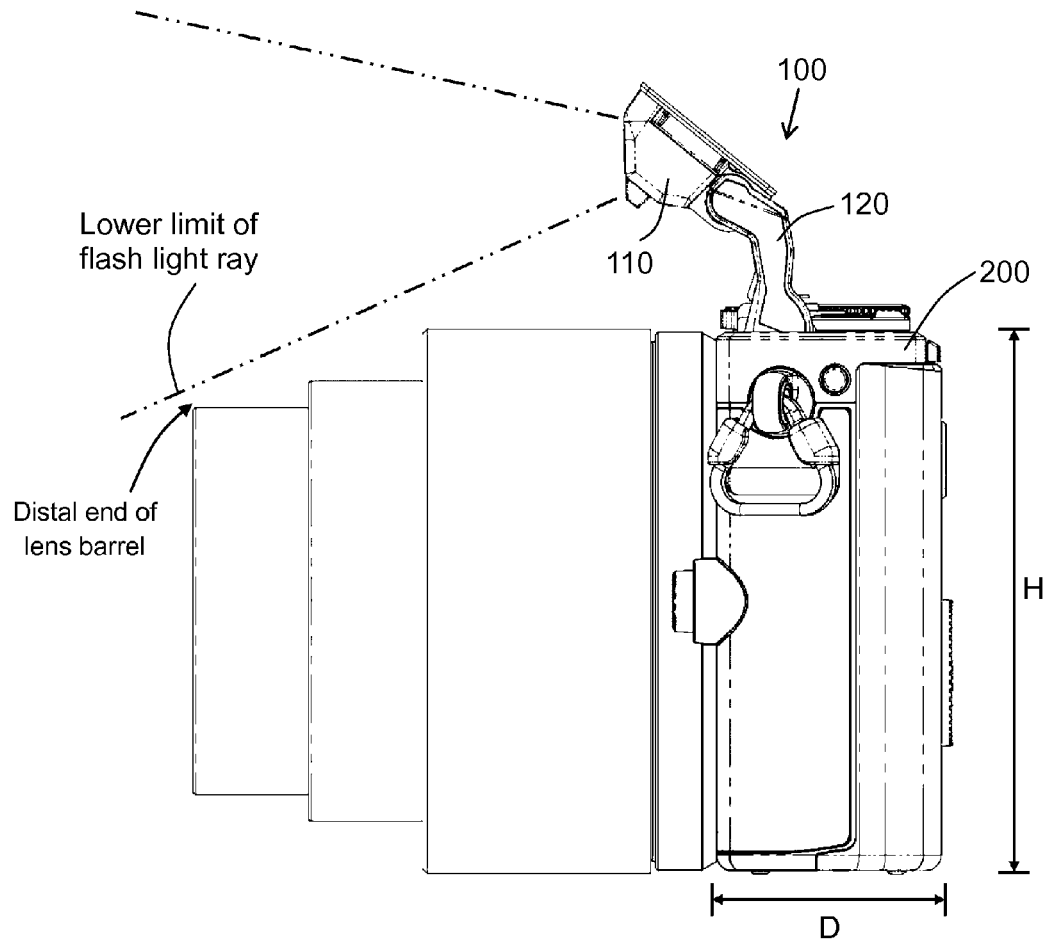
FIG. 4 is a right side view of the camera according to the first exemplary embodiment.

FIG. 2 is a front view of the camera, FIG. 3 is a top plan view of the camera, and FIG. 4 is a right side view of the camera. FIG. 2 to FIG. 4 show a state where strobe mechanism 100 pops up from camera housing 200 (opened state). The camera is configured such that strobe mechanism 100 pops up from camera housing 200.

As shown in FIG. 2 and FIG. 3, strobe mechanism 100 includes: strobe light emitting part 110; arm 120; slide member 130; locking member 140; operating portion 142; and link member 150. A user can change a state of strobe light emitting part 110 from a stored state (closed state) to a pop-up state (opened state) by operating portion 142 shown in FIG. 3 in an opening direction (in the direction indicated by an arrow).

The camera described in this exemplary embodiment is constituted of a camera body and an interchangeable lens. As shown in FIG. 4, strobe mechanism 100 pops up and hence, strobe light emitting part 110 moves to a position where vignetting by a distal end of a lens barrel of the interchangeable lens is not generated. That is, in an opened state of strobe mechanism 100, a lower limit of a flash light ray emitted from strobe light emitting part 110 is not blocked by the distal end of the lens barrel of the interchangeable lens.

Inventor of the present disclosure has come up with strobe mechanism 100 which can further decrease a height (H) and a thickness (D) of a camera body.

[1-2. Constitution of Strobe Mechanism]

Figure 5A:
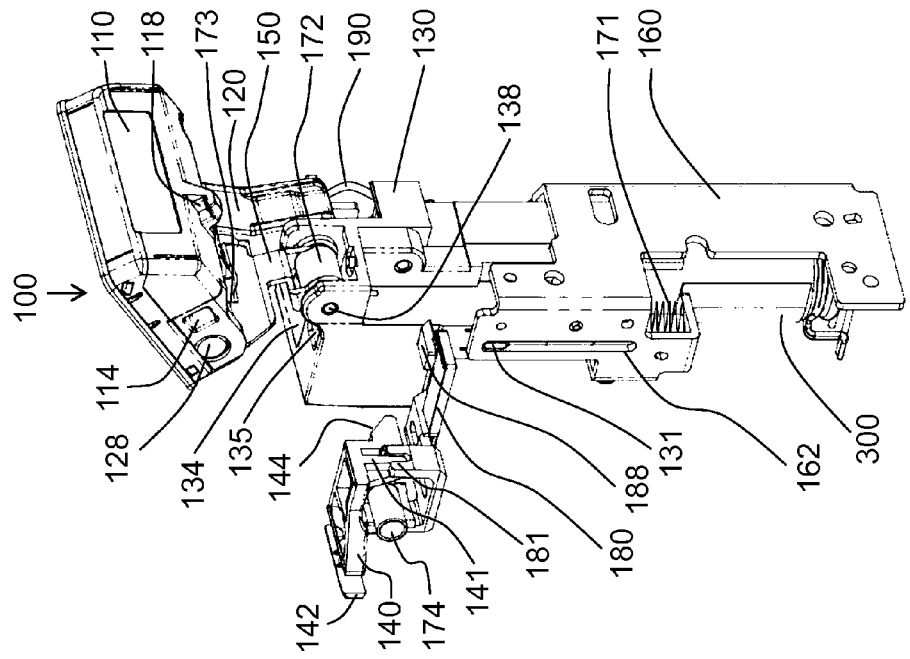
FIG. 5A is a perspective view as viewed from a left front side of a strobe mechanism (closed state) according to the first exemplary embodiment.
Figure 5B:
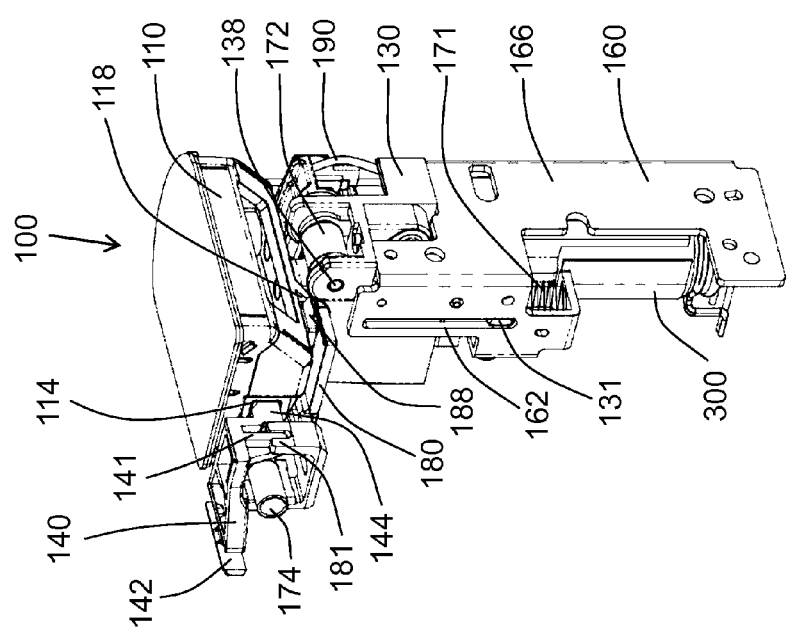
FIG. 5B is a perspective view as viewed from a left front side of the strobe mechanism (opened state) according to the first exemplary embodiment.
Figure 6A:
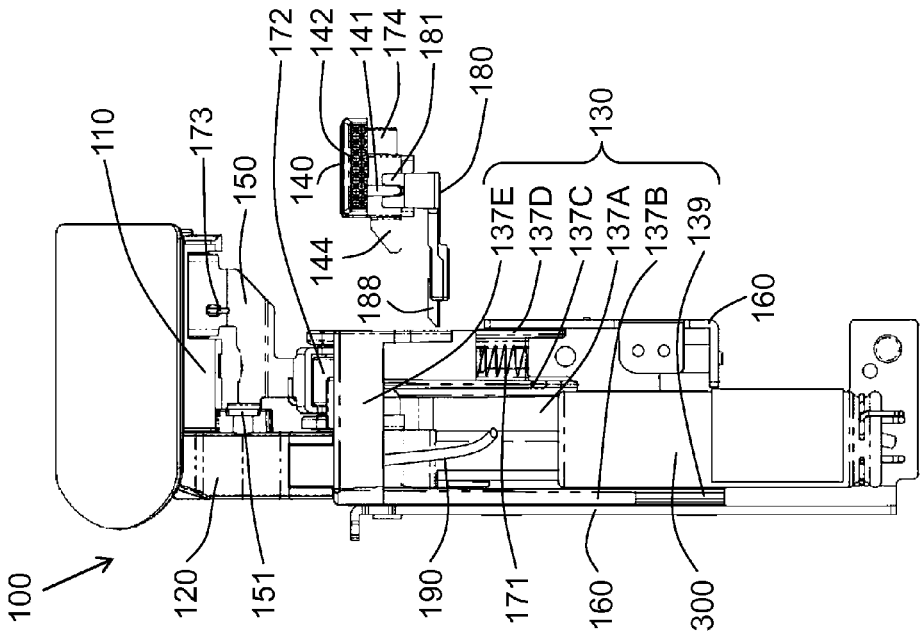
FIG. 6A is a back view of the strobe mechanism (closed state) according to the first exemplary embodiment.
Figure 6B:
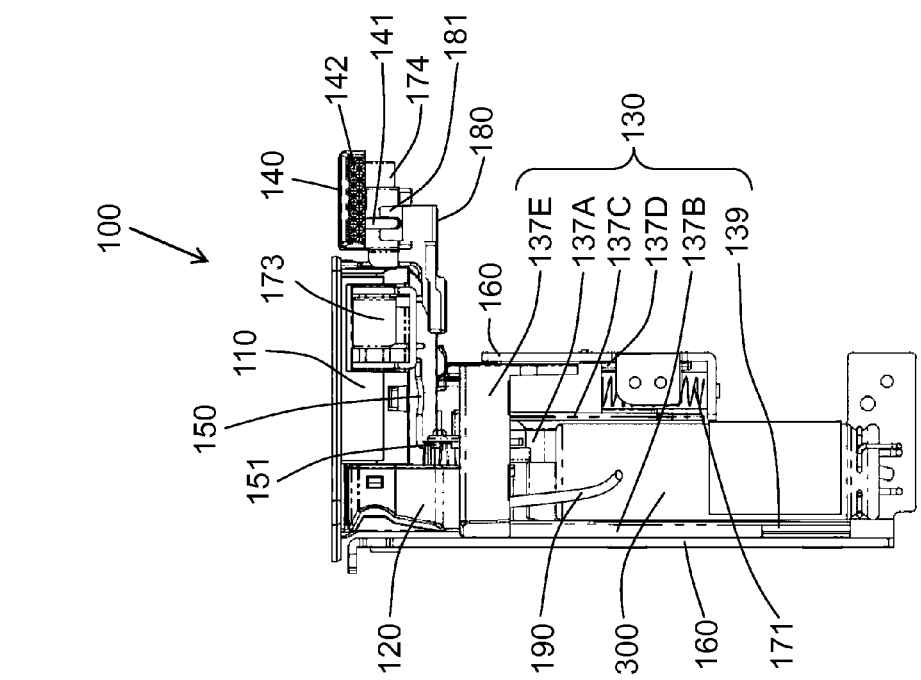
FIG. 6B is a back view of the strobe mechanism (opened state) according to the first exemplary embodiment.
Figure 7A:
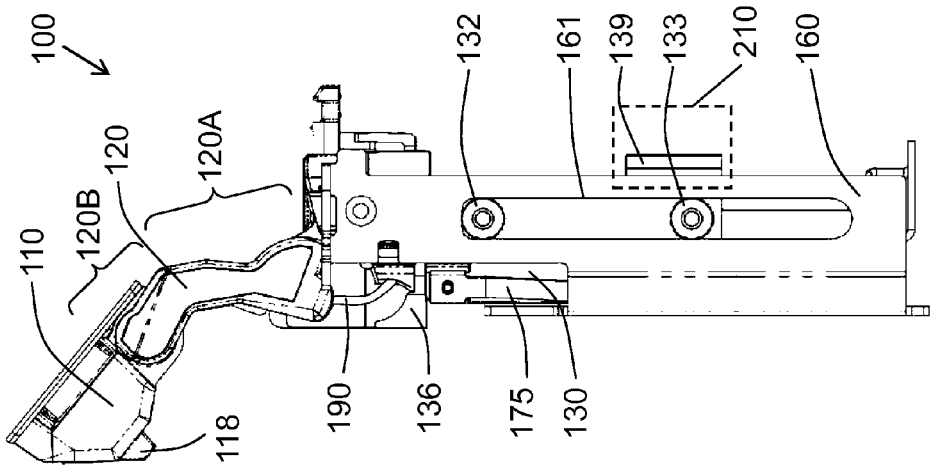
FIG. 7A is a right side view of the strobe mechanism (closed state) according to the first exemplary embodiment.
Figure 7B:
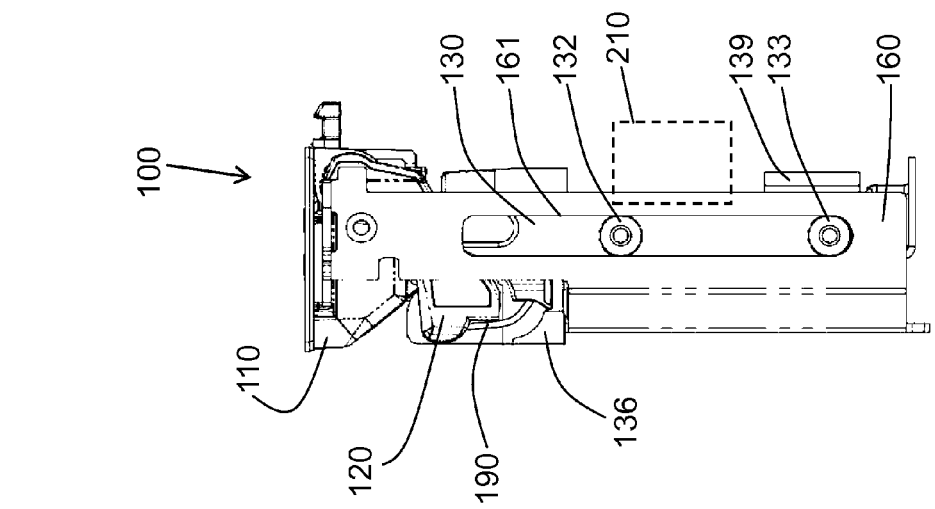
FIG. 7B is a right side view of the strobe mechanism (opened state) according to the first exemplary embodiment.
Figure 8A:
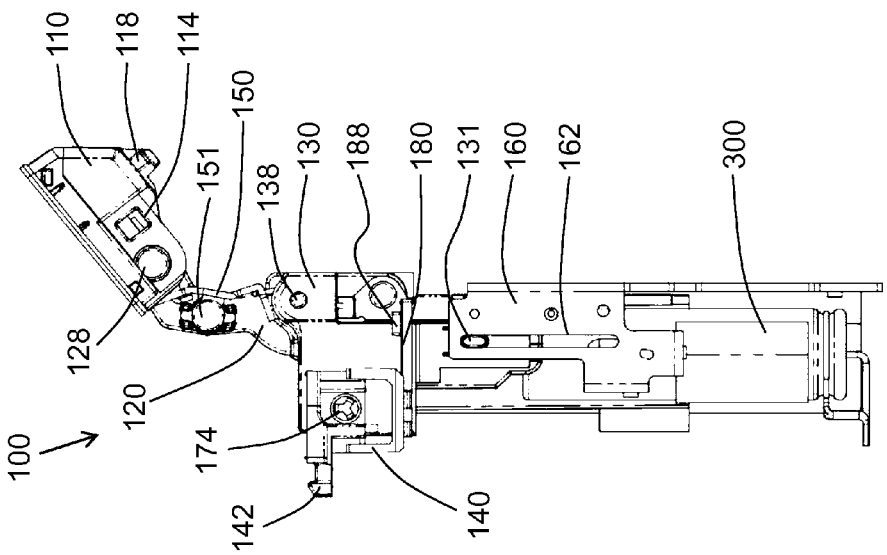
FIG. 8A is a left side view of the strobe mechanism (closed state) according to the first exemplary embodiment.
Figure 8B:
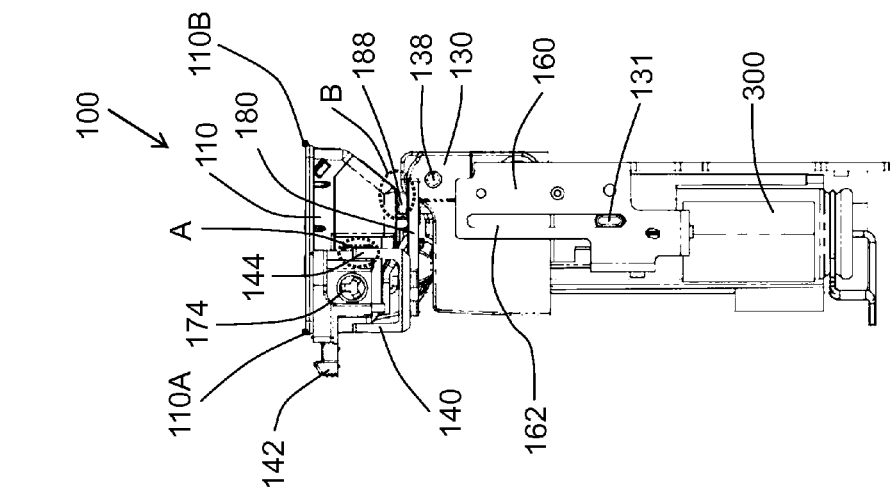
FIG. 8B is a left side view of the strobe mechanism (opened state) according to the first exemplary embodiment.

FIG. 5A is a perspective view as viewed from a left front side of the strobe mechanism (closed state), and FIG. 5B is a perspective view as viewed from a left front side of the strobe mechanism (opened state). FIG. 6A is a back view of the strobe mechanism (closed state), and FIG. 6B is a back view of the strobe mechanism (opened state). FIG. 7A is a right side view of the strobe mechanism (closed state), and FIG. 7B is a right side view of the strobe mechanism (opened state). FIG. 8A is a left side view of the strobe mechanism (closed state), and FIG. 8B is a left side view of the strobe mechanism (opened state). FIG. 9A is a perspective view as viewed from a right rear side of the strobe mechanism (closed state), and FIG. 9B is a perspective view as viewed from the right rear side of the strobe mechanism (opened state). FIG. 10A is an explanatory view of the arm and electric wiring of the strobe mechanism (closed state), and FIG. 10B is an explanatory view of the arm and the electric wiring of the strobe mechanism (opened state).

As shown in FIG. 5A and FIG. 5B, strobe mechanism 100 includes: strobe light emitting part 110; arm 120; slide member 130; locking member 140; link member 150; base member 160; springs 171 to 174; locking member 180; lead wire 190; and capacitor 300.

Strobe light emitting part 110 is electrically connected to capacitor 300 via lead wire 190 and a substrate. Strobe mechanism 100 can irradiate a subject by emitting light from strobe light emitting part 110.

Arm 120 is a member which connects strobe light emitting part 110 and slide member 130 to each other for moving strobe light emitting part 110 toward a subject side. As shown in FIG. 7B, arm 120 is formed by rising arm portion 120A and frontwardly-inclined arm portion 120B and formed into an approximately L shape. In an opened state, arm 120 rotates about shaft 138 shown in FIG. 5A and FIG. 5B thus moving strobe light emitting part 110 toward the subject side while lifting up strobe light emitting part 110 with respect to slide member 130. In a closed state, as shown in FIG. 10A, strobe light emitting part 110 is stored in a recessed portion defined by rising arm portion 120A and frontwardly-inclined arm portion 120B.

Lead wire 190 is arranged inside arm 120. As shown in FIG. 10A and FIG. 10B, lead wire 190 is connected to strobe light emitting part 110 through the inside of arm 120. Further, as shown in FIG. 7A and FIG. 7B, slide member 130 has arcuate guide portion 136 which guides the wiring of lead wire 190. Guide portion 136 guides lead wire 190 to an appropriate position when a state of strobe mechanism 100 is switched between an opened state and a closed state. As shown in FIG. 10A and FIG. 10B, in the closed state and in the opened state, guide portion 136 guides lead wire 190. Strobe mechanism 100 includes: slide member 130 which vertically moves along base member 160; and a movable part referred to as arm 120 which rotatably moves in the front-back direction. Accordingly, to prevent disconnection of lead wire 190 or the like, it is necessary to guide lead wire 190 to an appropriate position by guide portion 136.

Slide member 130 is a member provided for moving strobe light emitting part 110 in the vertical direction with respect to base member 160. As shown in FIG. 5A and FIG. 5B, slide member 130 is positioned at a lower side in the closed state, and is positioned at an upper side in the opened state. As shown in FIG. 6A and FIG. 6B, slide member 130 includes: front surface wall 137A; right side wall 137B; center wall 137C; left side wall 137D; back surface wall 137E; and projecting portion 139 which is formed on a lower side of right side wall 137B. In slide member 130, a hollow region surrounded by front surface wall 137A, right side wall 137B and center wall 137C and having a U-shape in cross section in the horizontal direction is formed. Capacitor 300 is arranged in the hollow region defined inside the U-shape so that the hollow region is effectively utilized. Such an effective use of the hollow region contributes to the miniaturization of the camera body. Slide member 130 moves relative to capacitor 300 fixed to camera housing 200 at a position where slide member 130 does not come into contact with capacitor 300.

Further, in slide member 130, a hollow region surrounded by front surface wall 137A, center wall 137C, and left side wall 137D and having a U-shape in cross section in the horizontal direction is formed. Spring 171 is arranged in the hollow region defined inside the U-shape. Center wall 137C is provided so as to prevent lead wire 190 from moving toward a spring 171 side and being caught by spring 171 or the like. Spring 171 has a lower end thereof fixed to base member 160, and biases slide member 130 such that slide member 130 moves in the vertical direction with respect to base member 160.

Projecting portion 139 formed on the lower side of right side wall 137B of slide member 130 shown in FIG. 7A and FIG. 7B is used for detecting whether or not strobe mechanism 100 is in the opened state. That is, it is determined whether or not strobe mechanism 100 is in the opened state by detecting the presence or the non-presence of projecting portion 139 of slide member 130 by detection part 210 mounted on camera housing 200. In this exemplary embodiment, detection part 210 is arranged at a position surrounded by a broken line shown in FIG. 7A, FIG. 7B, FIG. 9A, and FIG. 9B. As shown in FIG. 7B, when projecting portion 139 is at a position corresponding to detection part 210, detection part 210 detects projecting portion 139 thus detecting that strobe mechanism 100 is in the opened state.

Base member 160 holds slide member 130 in a state where slide member 130 is movable in the vertical direction. Base member 160 is made of metal and is held by camera housing 200. Accordingly, slide member 130 moves in the vertical direction relative to camera housing 200. Base member 160 has at least a portion thereof formed into a U-shape in horizontal cross section, and this U-shape is larger than the U-shape of slide member 130 and hence, as shown in FIG. 6A and FIG. 6B, base member 160 holds slide member 130 from the outside. Accordingly, slide member 130 can move the inside of base member 160 in a more stable manner.

Base member 160 has, to hold slide member 130 in a movable manner in the inside thereof, guide groove 161 on a right side surface thereof as shown in FIG. 7A and FIG. 7B and guide groove 162 on a left side surface thereof as shown in FIG. 8A and FIG. 8B. Guide rib 131 formed on the left side surface of slide member 130 is arranged in the inside of guide groove 162 in a slidable manner. Further, guide rib 132 and guide rib 133 which are formed on the right side surface of slide member 130 are arranged in the inside of guide groove 161 in a slidable manner. Since guide ribs 131, 132, 133 move along guide groove 161 and guide groove 162, slide member 130 moves in the vertical direction with respect to base member 160. Since guide rib 132 and guide rib 133 move in a slidable manner in the inside of guide groove 161, rattling of strobe mechanism 100 which may occur when the position of slide member 130 changes from the closed state to the opened state can be decreased. The reason why the rattling is decreased is described hereinafter.

For example, in a case where the guide rib is formed at one place on the right side surface of base member 160, slide member 130 rotates about an axis which connects the guide rib on the right side surface and the guide rib on the left side surface and hence, rattling is liable to occur. In this case, by forming the guide rib in an elongated shape, even when only one guide rib is formed, it is possible to prevent the occurrence of rattling. However, a sliding area between the guide rib and the guide groove is increased and hence, a friction resistance is increased. In this exemplary embodiment, two upper and lower guide ribs, that is, guide ribs 132, 133 are formed on the right side surface of slide member 130 and hence, the occurrence of rattling can be prevented, and friction can be also decreased whereby the movement of slide member 130 becomes stable.

As shown in FIG. 9A and FIG. 9B, spring 171 is arranged between base member 160 and slide member 130. Spring 171 imparts an upward biasing force to slide member 130. When locking by locking member 140 and locking member 180 shown in FIG. 5A and FIG. 5B is released in the closed state, strobe light emitting part 110 moves upward by the biasing force of spring 171. In this manner, the slide mechanism of strobe mechanism 100 is embodied by slide member 130 and spring 171 with respect to base member 160.

Link member 150 is a member made of a metal material and connecting strobe light emitting part 110 and slide member 130 to each other. As shown in FIG. 5B and FIG. 6B, spring 173 is arranged between link member 150 and strobe light emitting part 110, and spring 172 is arranged between link member 150 and slide member 130. Spring 172 biases slide member 130 and arm 120 in the direction that slide member 130 and arm 120 are away from each other about shaft 138. Further, spring 173 biases arm 120 and strobe light emitting part 110 in the direction that arm 120 and strobe light emitting part 110 are away from each other about shaft 128. Accordingly, when locking by locking member 140 and locking member 180 is released in the closed state, strobe light emitting part 110 is raised and moves toward the subject side from slide member 130 so that an irradiation direction of a strobe is directed toward the subject side. With such a constitution, the rotation mechanism of arm 120 is embodied by spring 172, link member 150 and spring 173 with respect to slide member 130. As shown in FIG. 6B, link member 150 is connected to arm 120 at connecting portion 151, and rotates about shaft 138 integrally with arm 120 when a state of strobe mechanism 100 is switched between the opened state and the closed state.

Next, the locking mechanism for switching a state of strobe mechanism 100 between the opened state and the closed state is described. As shown in FIG. 5A and FIG. 5B, locking member 140 includes: linking portion 141; operating portion 142, pawl portion 144, and spring 174. Locking member 180 includes: linking portion 181; and pawl portion 188. Linking portion 141 of locking member 140 is engaged with linking portion 181 of locking member 180 and hence, locking member 140 and locking member 180 can be integrally moved. Operating portion 142 is a slide lever which is operated by a user. A biasing force is applied to pawl portion 144 by spring 174 in the direction toward strobe light emitting part 110. In the closed state, pawl portion 144 of locking member 140 is inserted into pawl catching portion 114 of strobe light emitting part 110. Linking portion 181 of locking member 180 is engaged with linking portion 141 and hence, a biasing force is applied also to pawl portion 188 by spring 174 in the direction toward strobe light emitting part 110. In the closed state, pawl portion 188 of locking member 180 is inserted into pawl catching portion 118 of strobe light emitting part 110. In this manner, since pawl portion 144 is inserted into pawl catching portion 114 and pawl portion 188 is inserted into pawl catching portion 118, strobe light emitting part 110 is held in the closed state.

When operating portion 142 is operated in the opening direction shown in FIG. 3 against the biasing force of spring 174, the locking mechanism of locking member 140 and locking member 180 is released so that strobe mechanism 100 is shifted to the opened state from the closed state. Further, in the opened state, when the user pushes down strobe mechanism 100 to a position where the locking mechanism of locking member 140 and locking member 180 functions with respect to camera housing 200, strobe mechanism 100 changes to the closed state.

Strobe light emitting part 110 receives an upward force generated by biasing forces of spring 171, spring 172, and spring 173 in the closed state. Accordingly, by holding strobe light emitting part 110 by two portions (portion A and portion B indicated by a broken line in FIG. 8A), that is, pawl portion 144 and pawl portion 188, it is possible to avoid the occurrence of a state where front end portion 110A or rear end portion 110B of strobe light emitting part 110 is floated in the closed state.

In the closed state, when the user moves operating portion 142 in the opening direction, locking member 180 moves along with the movement of locking member 140. Due to such movement, pawl portion 144 and pawl portion 188 are disengaged from pawl catching portion 114 and pawl catching portion 118 respectively. As a result, strobe light emitting part 110 moves to the opened-state position due to biasing forces of spring 171, spring 172 and spring 173.

Further, as shown in FIG. 7B, leaf spring 175 which is an electrically conducive member is mounted on slide member 130. Leaf spring 175 connects metal-made link member 150 and metal-made base member 160 to each other, while base member 160 is grounded to a camera. Accordingly, static electricity generated in link member 150 is grounded through leaf spring 175 and base member 160 thus enhancing static electricity eliminating property of the camera.

[1-3. Advantageous Effects and the Like]

In strobe mechanism 100, strobe light emitting part 110 pops up due to the movement thereof in the upward direction using the slide mechanism and the movement thereof toward the subject side using the rotation mechanism of arm 120. With such a constitution, strobe mechanism 100 can be miniaturized and the vignetting of strobe light rays by the lens barrel can be further decreased.

In strobe mechanism 100, capacitor 300 is arranged in the hollow region formed in the inside of base member 160 and slide member 130. Accordingly, capacitor 300 can be efficiently arranged thus miniaturizing the device as a whole.

In strobe mechanism 100, guide portion 136 is mounted on slide member 130. Accordingly, it is possible to suppress the disconnection of lead wire 190 which may occur due to the movement of the slide mechanism or the rotation mechanism of arm 120.

In strobe mechanism 100, center wall 137C is arranged at a position adjacent to spring 171 of slide member 130. Accordingly, an operation failure (operation failure in the vertical movement) where lead wire 190 is caught by spring 171 can be decreased. Accordingly, the disconnection of lead wire 190 can be further decreased.

In strobe mechanism 100, strobe light emitting part 110 is held by two portions, that is, locking member 140 and locking member 180 in the closed state. Accordingly, it is possible to further decrease the floating of strobe light emitting part 110 when biasing forces are applied to strobe light emitting part 110 for realizing the popping up of strobe light emitting part 110 using the slide mechanism and the rotation mechanism of arm 120 in the closed state.

(Other Exemplary Embodiments)

As described above, the first exemplary embodiment has been described as one example of the techniques disclosed by this application. However, the techniques according to the present disclosure are not limited to the first exemplary embodiment, and are also applicable to an exemplary embodiment to which changes, replacements, additions, omissions and the like are suitably made.

In the first exemplary embodiment, the locking member 140 and the locking member 180 are formed of different members respectively. However, the locking member 140 and the locking member 180 are formed as an integral body.

Further, in the first exemplary embodiment, strobe light emitting part 110 is held by two portions, that is, locking member 140 and locking member 180. However, strobe light emitting part 110 may be held by one portion or three or more portions. Furthermore, it is preferable that strobe light emitting part 110 is held by two or more portions for preventing the floating of strobe light emitting part 110.

In the first exemplary embodiment, lead wire 190 is formed by binding two power source wires and two signal wires into a single wire. However, it is not always necessary to form lead wire 190 by binding two power source wires and two signal wires into a single wire.

As described above, the exemplary embodiment has been described for exemplifying the technique according to the present disclosure. The accompanying drawings and the detailed descriptions are provided for this purpose.

Accordingly, the constituents described in the accompanying drawings and the detailed description may also include constituents which are unnecessary for overcoming the problems, in order to exemplify the aforementioned techniques, as well as constituents necessary for overcoming the problems. Therefore, such unnecessary constituents should not be immediately determined to be necessary, for the reason that these unnecessary constituents are described in the accompanying drawings and the detailed description.

Further, the aforementioned exemplary embodiment is merely for exemplifying the techniques according to the present disclosure and, therefore, various changes, replacements, additions, omissions and the like can be made thereto within the scope of the claims and scopes equivalent thereto.

INDUSTRIAL APPLICABILITY

The techniques according to the present disclosure are applicable to a strobe mechanism used for an imaging device or the like. To be more specific, the techniques according to the present disclosure are applicable to a digital steel camera, a mirror-less camera, a single-lens reflex camera, a movie camera or the like.

What is claimed is:

1. A strobe mechanism which brings a strobe into a use state by making the strobe pop up from a stored state, the strobe mechanism comprising:
    a base member;
    a slide member held in a movable manner in one direction with respect to the base member;
    a strobe part which is mounted on the slide member; and
    a capacitor which supplies electric power to the strobe part, the capacitor being arranged in a region defined by walls of the slide member,
    wherein the capacitor does not move in conjunction with movement of the slide member, such that the slide member is linearly movable in the one direction relative to the capacitor and does not come into contact with the capacitor,
    wherein a part of outer periphery of the capacitor is surrounded by walls of the slide member, and
    wherein the one direction along which the slide member is movable is along a central axis of the capacitor.

2. The strobe mechanism according to claim 1, wherein the base member has a U-shape,
    the slide member has a U-shape which is smaller than the U-shape of the base member, and
    the capacitor is arranged inside the U-shape formed by the slide member.

3. The strobe mechanism according to claim 1, wherein the strobe part is connected to the slide member by an arm, and
    the strobe part is moved toward a subject side by the arm upon a pop up action from the stored state.

4. The strobe mechanism according to claim 1, wherein the strobe part has electric wiring, and
    the slide member includes an arcuate guide portion which guides the electric wiring.

5. The strobe mechanism according to claim 4, wherein the slide member is configured to pop up from the stored state by a biasing member, and
    the slide member has a wall between the electric wiring which passes through the slide member and the biasing member.

6. The strobe mechanism according to claim 1, wherein the strobe part is held at two or more portions in the stored state and is configured to pop up when the holding of the strobe part is released.

7. The strobe mechanism according to claim 1, wherein the central axis of the capacitor is a central longitudinal axis.

\* \* \* \* \*